Patented June 18, 1946

2,402,448

UNITED STATES PATENT OFFICE 2,402,448

CHEMICAL PROCESS

Prescott L. Richards, Summit, N. J., assignor to Standard Oil Development Company, a corporation of Delaware.

No Drawing. Application April 20, 1944, Serial No. 531,994

12 Claims. (Cl. 252—42.7)

This invention relates to an improved process of preparing or improving metal derivatives of alkyl phenols or their derivatives, as well as to the products thus prepared and to uses thereof. As a specific instance, the invention relates to the improvement of chemical compounds such as the barium salt of diisobutyl (i. e. tertiary isooctyl) phenol or of the corresponding sulfide or other derivative thereof, and products made by treating such salts with a sulfurizing agent such as elemental sulfur or a phosphorus sulfide.

Chemical compounds of the class just referred to have been used as lubricating oil additives, particularly in heavy duty oils used for lubricating high speed Diesel and gasoline engines, for the reason that these additives have excellent detergent properties and improve the performance of the lubricant. They do, however, possess to some extent the undesirable property of being water-sensitive, that is when contacted with a small amount of water, they form a sludge which may remain emulsified in the oil or settle out as a flocculent precipitate. This characteristic of the additive, while not affecting the performance of the oil, is nevertheless undesirable in certain respects such as in storage or handling where the oil is apt to become contaminated with water.

The primary object of the present invention is therefore to treat such additives during the process of manufacture in order to render them water-insensitive so that lubricating oils, or other products in which they may be used, will not tend to emulsify or form sludge when contacted with water.

The invention, insofar as treatment of metal salts of alkylated hydroxy aromatic compounds with a sulfurizing agent is concerned, is considered to apply broadly to substituted metal phenolates or compounds containing at least one grouping having the general formula

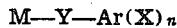

where M is a metal, Y is an element in the right-hand side of group VI of the Periodic Table (Mendeleeff), Ar is an aromatic nucleus which contains like or unlike substituents, X, n in number, replacing nuclear hydrogen, n being at least one.

M may be any metal such as barium, calcium, strontium, aluminum, cobalt, chromium, magnesium, manganese, sodium, nickel, lead, tin, zinc, copper, iron, cadmium, potassium, lithium and the like, polyvalent metals being preferred.

The substituents, X, may be organic, inorganic, or both. For example, they may be alkyl radicals or groups containing one or more of the non-metallic elements belonging to groups V, VI, and VII of the Periodic System (Mendeleeff): nitrogen, phosphorus, oxygen, sulfur, and halogens, as in amino, nitro, phosphite, phosphate, hydroxy, alkoxy, sulfide, thioether, mercapto, chloro groups, and the like, or they may be organic radicals containing one or more of the inorganic groups.

In the phenolate salts, if only one of the valences of a polyvalent metal is connected to a substituted phenolic radical, such as

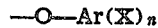

the other should be connected to other organic groups or to inorganic constituents. For convenience, non-phenolic radicals or groups, as well as phenolic groups, attached to the metal are indicated broadly by R in the following types of compositional formulae, which broadly represent metal derivatives of substituted phenolic compounds containing the characteristic compositional grouping described:

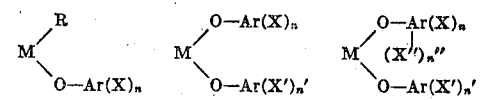

Where oxygen is shown in these formulae it may be replaced by sulfur, selenium or tellurium, as in the case of thiophenolic compounds.

More specifically, some of the structures which substituted divalent metal phenolates may have are indicated in the following list of formulae containing benzene nuclei of compositions —$C_6H_4$—, —$C_6H_3$—, etc., with X, as before, standing for nuclear substituents (e. g., —$C_nH_{2n+1}$, —$NO_2$, —Cl, —S—, —$S_2$—, —$NH_2$, $NH(C_nH_{2n+1})$ etc.):

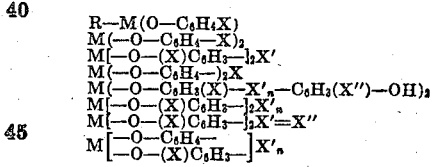

Corresponding monovalent metal derivatives would be:

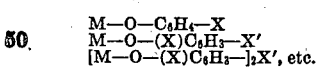

Similarly trivalent or other polyvalent metal derivatives may be used such as:

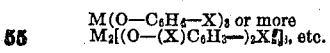

Corresponding metal derivatives of the following illustrative types of substituted phenolic compounds are among those that can be used, in which R represents an alkyl group, preferably having at least 4 carbon atoms:

Group A:

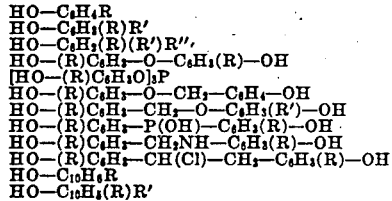

All these compounds when employed in high temperature lubrication service tend to corrode such sensitive engine parts as copper-lead and cadmium-silver bearings. This characteristic can usually be corrected by including, in the lubricating composition, suitable antioxidants or other anti-corrosion agents, e. g. benzyl para-amino phenol, alpha naphthol, tertiary amyl phenol sulfide, triphenyl phosphite, dibutyl amine, etc. It may be mentioned that metallic soaps of carboxylic acids are considerably more corrosive than the phenolic salts and that their corrosiveness is less amenable to correction by the use of antioxidants, etc.

However, this corrosion problem can also be at least partially and in most cases completely taken care of by chemically incorporating an element of the sulfur family (i. e. S, Se, and Te), sulfur itself being very effective, into the structure of the substituted phenolate metal salts, thus making unnecessary the addition of any separate anti-corrosion agent. Thus the metal derivatives of the following illustrative types of substituted phenolic compounds are preferred over those listed in Group A above.

Group B:

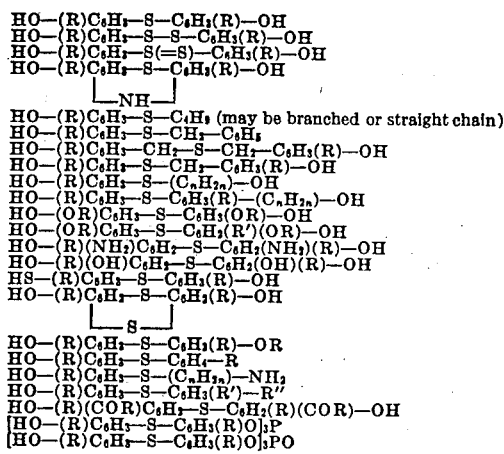

These preferred phenolates may also contain sulfur in other positions or groups at the same time as in the places shown in the formulae in Group B. Furthermore, the formulae in Group A may have sulfur incorporated therein. More broadly it may be stated that inorganic substituents, particularly negative inorganic groups containing non-metallic elements of groups V, VI, and VII of the Mendeleeff Periodic System, beneficially influence the phenolates by increasing their potentency for stabilizing the lubricating oils and by making the phenolates, in themselves, more stable, as for instance, against hydrolysis.

Desirable because they are both very efficient and also lend themselves to easy and economical manufacture, are compounds containing at least one grouping having the general formula:

Where Ar is an aromatic nucleus, R is an organic group, Z is a member of the sulphur family, and $n$ is an integer of 1 to 5. Z is preferably sulfur, and $n$ is preferably 1 or 2. R represents an organic group which may be either aryl, alkyl, alkaryl, aralkyl or cycloalkyl, and which may contain substituent groups such as halogen, particularly chlorine, nitro, nitroso, amino, hydroxy, carboxy, alkoxy, aroxy, mercapto, and the like, but R preferably is or contains an alkyl or alkylenyl group, and preferably contains at least 4 carbon atoms but may contain many more, such as 8, 10, 16, 18, 24, etc.

The configurations of the compounds are not limited to certain positions for the substituent groups, for these may be in ortho, para, or meta relations to one another. Also, the substituents, X, in broader formulae discussed previously in any aromatic nucleus may be alike or different.

The aromatic nucleus may be polycyclic as in naphthalene, phenanthrene, diphenyl, etc. Where oxygen occurs, it may be replaced by sulfur, selenium, or tellurium, as in the case of thio-phenolic compounds.

An important feature of this invention issues from the observation that metal phenolates are benefited in solubility and effectiveness as hydrocarbon lubricating oil blending agents when they contain a total of at least 8 and preferably 10 or more carbon atoms per molecule in aliphatic groupings, when sulfur is present in the molecule, and at least 16 carbon atoms and preferably 18 or more, if no sulfur is present.

Specific examples of preferred substituted phenolates falling into the classes mentioned, having at least one alkyl radical as a substituent, and using barium as example of a suitable metal, are formulated as follows:

I. Alkyl phenolates:

$Ba(O-C_6H_4-C_nH_{2n+1})_2$
$Ba[O-C_6H_3(C_nH_{2n+1})_2]_2$

E. g. barium salts of diisobutyl phenol (p-tert. octyl phenol), octadecyl phenol, and 2,4-ditertiary amyl phenol.

II. Alkyl chlorphenolates:

$Ba(O-C_6H_3Cl-C_nH_{2n+1})_2$
$Ba(O-C_6H_2Cl_2-C_nH_{2n+1})_2$
$Ba[O-C_6H_2Cl(C_nH_{2n+1})_2]_2$

E. g. barium salts of 2 chloro, 4 octadecyl phenol, 2,6-dichloro, 4 diisobutyl phenol, and 6 chloro, 2,4-ditertiary amyl phenol.

III. Alkyl amino phenolates:

$Ba[OC_6H_3CH_2N(C_xH_y)_2(C_nH_{2n+1})]_2$

E. g. barium salts of dicyclohexyl amino methyl diisobutyl phenol.

IV. Thioethers of alkyl phenolates:

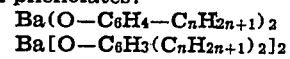

E. g. barium tertiary octyl phenol sulfide, barium tertiary amyl cresol sulfide, and barium 2,4-ditertiary amyl phenol sulfide.

V. Disulfides of alkyl phenolates:

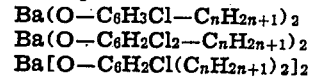

E. g. salts of tertiary amyl phenol disulfide.

VI. Phosphorus acid esters of alkyl phenol sulfides:

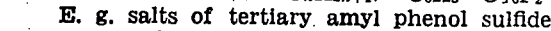

E. g. salts of tertiary amyl phenol sulfide monophosphite.

Other examples of metal phenolates and metal alkyl phenol sulfides which may be treated in accordance with the present invention include: calcium tertiary octyl phenolate, calcium wax-alkyl phenolate, calcium tertiary amyl phenolate, calcium tertiary butyl phenolate, calcium salt of petroleum phenols, calcium salt of phenol alkylated with triisobutylene or tetraisobutylene, magnesium tertiary octyl phenolate, cobalt tertiary octyl phenolate, calcium tertiary amyl phenol sulfide, tin salts of wax alkylated salicyclic acid sulfide, magnesium tertiary octyl phenol sulfide, and barium salts of $C_{16}$—$C_{20}$ branched chain alkyl phenol sulfides prepared from phenols alkylated with refinery butene polymers, etc. An example of a trivalent metal alkyl phenol sulfide is aluminum tertiary amyl phenol sulfide which may be represented in a general way by the formula $[(C_5H_{11}-C_6H_3-O)_2S]_3Al_2$ which may be written out more in detail as follows:

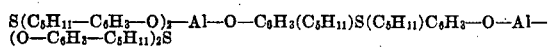

The alkyl hydroxy aryl compound should have more than three aliphatic carbon atoms and preferably more than 6, such as 8, 10, 12, etc., up to 24 or more as in the case of paraffinic radicals derived from paraffin wax or olefinic polymers, such as dimers, trimers, tetramers, etc., of isobutylene. Branched, especially highly branched, alkyl radicals are preferred.

The aromatic nucleus of the alkyl hydroxy aryl compound may be mononuclear as in the case of a benzene nucleus or polynuclear as in the case of a naphthalene nucleus. Instead of using pure individual phenolic materials, one may use crude commercial products which may be mixtures of two or more alkyl hydroxy aryl compounds, such as crude petroleum phenols which have an average chemical composition indicating the presence of four aliphatic carbon atoms and an amount of oxygen slightly in excess of that called for by the formula $C_4H_9C_6H_4OH$ or separate fractions of such phenols. Similarly crude phenolic materials of coal tar origin may be used such as the so-called tri-cresol which is a mixture of isomeric ortho, meta and paracresols, which should, of course, be further alkylated with a higher alkyl group, for best results from an oil-solubility point of view.

In the preparation of alkyl phenol sulfides by reaction of the alkyl hydroxy aromatic compound with a sulfur halide, e. g. $SCl_2$ or $S_2Cl_2$, a small amount of halogen may be found to combine with the aromatic compound in some unknown manner, but the proportion of such combined halogen is very small and is not objectionable.

Before carrying out the neutralization of the alkyl hydroxy aromatic compound for converting the latter into the corresponding metal derivative or salt, the alkylated phenol or sulfide or other derivative thereof is preferably dissolved in a lubricating oil base stock having a viscosity within the approximate limits of 35 to 70 seconds Saybolt at 210° F. derived from any suitable petroleum crude and having any desired viscosity index.

The basic metal neutralizing agent is preferably a finely divided oxide or hydroxide of the desired metal such as an alkaline earth metal, e. g. calcium, barium, magnesium, etc. or other polyvalent metals such as nickel, cobalt, tin, lead, zinc, copper, cadmium, manganese, iron, chromium, aluminum, etc., or even monovalent metals such as sodium, potassium, lithium, etc. Although the invention is intended to apply particularly to metal salts resulting directly from a basic metal neutralizing agent, it may be used to some advantage in the case of corresponding metal salts made by double decomposition from other corresponding metal salts. For instance, one may first prepare a sodium salt of an alkyl phenol such as tertiary amyl phenol and then treat the latter with anhydrous barium bromide to form the corresponding barium salt of tertiary amyl phenol. In such a case the treatments to be discussed later may be applied either to the first-formed salt (i. e. the sodium salt) or to the one formed by double decomposition (i. e. the barium salt) or to both.

In carrying out the neutralization with a basic metal neutralizing agent, the reaction is preferably carried out at a temperature between the approximate limits of 20° C. (or room temperature) and about 220° C., preferably about 90° C. to 200° C. The mixture is preferably stirred during this neutralization reaction, for a sufficient length of time to insure complete reaction, and ordinarily an excess of the basic metal neutralizing agent is used so as to insure incorporation of the metal atom in each molecule of the alkyl hydroxy aromatic compound to produce for example a metal alkyl phenolate or a metal alkyl phenol sulfide, etc.

Now according to one feature of the present invention, the resultant solution of metal salt in lubricating oil, with or without minor amounts of stearyl alcohol or other additives such as those mentioned above, is treated with a weakly acid substance, preferably by blowing the solution with a weakly acid gas such as carbon dioxide, hydrogen sulfide, etc., preferably one whose alkali or alkaline earth salts are insoluble in oil, to reduce the water-sensitivity of the metal salt in the oil. Although such blowing with carbon dioxide, for instance, may effect a substantial benefit when used alone, it is preferable to carry out this treatment in the presence of, or subsequent to a treatment with, a controlled amount of $H_2O$ either in the form of water or steam which is believed to effect a partial hydrolysis of some of the metal salts present. It is to be noted that water itself below its boiling point tends to substantially hydrolyze the metal salts, but during subsequent drying and finishing operations the hydrolyzed fractions recombine to form water-sensitive material. It is the function of the $CO_2$ to render the metal inactive during finishing operations. Accordingly if the hydrolysis is carried out with water alone at temperatures below the boiling point of water, it is necessary to stop the reaction by treating with $CO_2$ prior to the finishing operation. Although the exact amount or proportion of treating agents such as carbon dioxide and steam undoubtedly must be varied to some extent according to the particular type of metal salt being treated and the way in which it was prepared, ordinarily the amount of carbon dioxide, or other weakly acid gas used, should be less than about 25%, and preferably about 1%–10%, by weight based on the amount of metal salt in the oil solution being treated. If the proportion of carbon dioxide is calculated on the weight of the entire oil solution being treated then it should be preferably about 0.5% to 5% by weight. Generally, for best results, more $CO_2$ is required for treating metal alkyl phenolates than metal alkyl phenol sulfides, and it is believed that this may be due to a chemical structure difference, namely that the phenolate molecule may only contain one —O—Ar, whereas the phenol sulfide must contain at least two such groups. The amount of $H_2O$ should be in the same general range or slightly less, i. e. up to less than about 20%, preferably about 0.2%–10%, based on the weight of metal salt being treated, or about 0.1% to 5% by weight based on the total oil solution being treated. One convenient and usually suitable way to do this is to use $CO_2$ saturated with moisture.

The use of controlled amounts of water or steam provides better control of the product and more uniform results than if the blowing with carbon dioxide is carried out in the absence of any $H_2O$. The amount of water or steam used is important. It has been found that there is a slight loss of metal content of the metal salt particularly during the treatment of the metal phenol sulfides with $CO_2$ and $H_2O$ if used simultaneously and that this loss increases with the amount of $H_2O$ used.

After the treatment with carbon dioxide and steam, or equivalent treating agents, the entire mixture is filtered, preferably with the use of a filter aid such as Hyflo, Dicalite or other inert diatomaceous earths or active clays such as, Superfiltrol, attaplugus, etc. Usually about 0.05 to 0.25 lb. of filter aid per gallon will give satisfactory improvement in the filtration.

The treatment with carbon dioxide and steam, or equivalent materials, may be carried out by batch operation or continuously, depending upon equipment available and quantity of material being processed. For batch operation the oil solution of the metal salt can be placed in any suitable container such as an open or closed tank, drum or kettle, etc., provided with heating or cooling coils or exchanger and a pipe or other suitable means of passing the carbon dioxide and steam (or water) into the oil-salt solution preferably near the bottom thereof so that the gas bubbling up through the solution will effect suitable agitation. A mechanical agitator may, of course, be provided. After the reaction has been completed the solution should then be discharged from the bottom of the container by gravity or by pressure blowing, or conveyed by any other suitable means such as by pumping, to a filter.

On the other hand, for continuous operation several alternative types of equipment may be used, one being an open vertical drum in which the fresh oil-salt solution is fed in at one side either at the surface or at the bottom or at some intermediate height, and the carbon dioxide and steam are blown into the solution near the bottom of the tank either through a pipe fitted to the bottom of the tank or else through a removable pipe which extends from the top of the tank down through the liquid near to the bottom, and the treated solution is then drawn off through a suitable overflow outlet or by a syphon or otherwise. For larger scale continuous operation it is probably best to use a vertical tower which may be of any desired dimensions of height and diameter and may contain packing materials such as rings, etc., or may be equipped with bubble trays and the like or not, in any case the oil-salt solution being fed into the top of the tower and the carbon dioxide and steam or water being fed into the bottom of the tower so that the solution and treating agents will flow countercurrently and the treated solution will be discharged continuously at the bottom of the tower by gravity and residual gases released at the top of the tower. The treatment with $CO_2$ and water (or steam) can be conducted either batch or continuous while maintaining a slight pressure of $CO_2$ or steam on the system. Such pressure will improve the solubility of the $CO_2$ and water (or steam) in the oil, resulting in better contact of the liquid and gas and thereby effecting better utilization of the treating agents.

The products resulting from the above treatment have low water-sensitivity and surprisingly improved oil-solubility, especially in the case of the metal alkyl phenolates.

Another feature of the invention is the application of the above-described treatment by $CO_2$ and steam, or their equivalents, in combination with a subsequent sulfurization with a sulfurizing agent comprising sulfur alone or combined with phosphorus.

It is already known that metal alkyl hydroxy aromatic compounds may be given such a sulfurization treatment, but the resulting products are objectionably water-sensitive, and attempts to reduce such water-sensitivity by treatment with $CO_2$ and steam have not been successful. Surprisingly, it has been found, however, that if the water-insensitizing treatment by $CO_2$ and steam is applied to the metal alkyl hydroxy aromatic compounds first prior to sulfurization with elemental sulfur or a phosphorus sulfide, the resulting product has low water-sensitivity.

This phase of the invention may be expressed broadly as comprising first the water-insensitization of metal compounds containing at least one grouping having the general formula

$$M—Y—Ar(X)_n$$

where M is a metal, Y is an element in the right-hand side of group VI of the periodic table, Ar is an aromatic nucleus which contains like or unlike substituents, X, $n$ in number, replacing nuclear hydrogen, $n$ being at least one, by treatment with a weakly acid substance alone or in conjunction with a hydrolyzing agent, and subsequently treating the resultant metal products with a treating agent having, in physical proportions or chemical combination, the general formula $P_xY'_y$ in which $x$ may be from 0 to 5, Y' is a member of the sulfur family, namely sulfur, selenium or tellurium, and $y$ is from 1 to 10.

Compared to products prepared by the reaction of alkylated phenols with halides of sulfur to give alkylated phenol thioethers or disulfides which are then converted to metal salts by appropriate means, which may for instance have the graphic formula

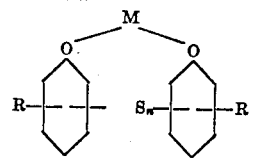

in which the sulfur is present as a bridge linking the aryl groups (in the above formula M is a metal, R is an alkyl substituent and $n$ is a small integer, usually 1 or 2, or between, e. g. 1.5), the products which are prepared by first converting alkyl phenols to their metal salts and then causing the salts to react with elemental sulfur, are of an entirely different structure. Although the exact structure of these products is not fully understood, it does not appear that the compounds contain a sulfur bridge between aryl nuclei as is the case with the metal salts of phenol sulfides, and it is probable that the sulfur is attached directly to the metal through secondary valence forces, as in the following formula:

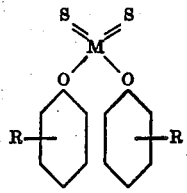

which probably represents a product formed when two atomic proportions of sulfur are reacted with one molecular proportion of barium tert.-octyl phenate.

One basis for believing that the sulfur is attached to metal rather than to carbon is that during the reaction of metal phenate with sulfur there is substantially no evolution of hydrogen sulfide. Another is that when the product is treated with hydrochloric acid it breaks down to an alkylated phenol, losing both metal and sulfur. On the other hand, similar treatment of a metal alkyl phenol sulfide with hydrochloric acid causes loss of metal only and the final product is the alkylated phenol sulfide.

If the elemental sulfur is reacted with a metal alkyl phenol sulfide, the elemental sulfur is believed to link with the metal in a similar manner as suggested above, and accordingly the general graphic formula in the case of a divalent metal would be about as follows:

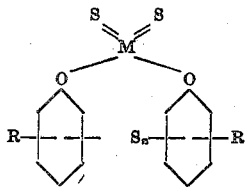

When reacting sulfur with a metal phenate or with a metal phenol sulfide, it is usually preferable to use from 2 to 3 atomic proportions of sulfur for each atomic proportion of metal, since in general this range imparts optimum corrosion inhibiting properties to the product. If too large a proportion of sulfur is used, oils containing the resultant additives tend to stain copper or alloys containing the same. The best results are usually obtained when about 2.5 atomic proportions of sulfur are added for each atomic proportion of metal.

Although these proportions are generally preferred for the preparation of crankcase oil additives, lower or higher percentages of sulfur may be employed when the additives are to be used as antioxidants for other organic materials, and as addition agents for extreme pressure lubricants.

If desired, these products may be prepared by simultaneous reaction of an alkylated phenol or an alkyl phenol sulfide, a polyvalent metal oxide or hydroxide and elemental sulfur. However, in order to avoid the formation of oil-insoluble materials, it is preferred to first form the metal phenate and then react this with sulfur. Also, although the reaction can be brought about by fusing the reactants together, it is more convenient to carry out the reaction with the aid of solvents, particularly high boiling hydrocarbon solvents, such as xylol or a petroleum fraction. A particularly preferred reaction medium is a lubricating oil fraction, since the final reaction product can thus be obtained as a mineral oil concentrate of the desired additive. Such concentrates may be conveniently stored or shipped as such to save weight and space and may later be readily blended with a lubricating oil base stock in the desired concentration to form a finished lubricating oil blend.

Similarly, useful products may be made by reaction of free sulfur with metal phenate salts of alkylated hydroxy carboxylic acids and their carboxylate salts, for example, the barium phenate-zinc carboxylate of lauryl salicyclic acid.

In carrying out the sulfurization of these various metal salts of hydroxy aromatic compounds, the temperature used may be about 90–210° C., preferably at 150–190° C. It has been found that products prepared by sulfurizing at 180–190° C. are the most desirable from the standpoint of water resistivity and freedom from the tendency to stain copper.

It has also been found that products of better oil solubility can sometimes be obtained when sulfurizing in the presence of small proportions of olefinic material, such as tetraisobutylene, cracked gas or an unsaturated alcohol.

It has been found, when preparing these additives in mineral oil, that good results are obtained if a minor proportion of a higher alcohol, such as lauryl, cetyl, stearyl, wool fat alcohol and the like, is added to the reaction mixture in which the compounds of the present invention are prepared. It has been determined by test that substantially none of the higher alcohol enters into the reaction. This alcohol reduces foaming during the process and acts as an auxiliary solvent for the final additive. The best results are obtained by adding a sufficient quantity of the alcohol to give a concentration of about 3% to 15% in the final additive concentrate. Other antifoaming agents may be used.

It is often convenient to prepare concentrates of the additives in oil, containing, say, 25 to 75% of effective addition agent, the concentrate later being added to a suitable lubricating oil base stock to give a finished blend containing the desired percentage of additive. Thus, when using a 40% concentrate, 2.5% of this material will be blended with a suitable base stock to give a finished oil containing 1% of effective addition agent.

If instead of reacting with elemental sulfur the metallic phenate or other analogous metal derivative of an aromatic hydroxy or mercapto compound is caused to react with both of the elements sulfur and phosphorus, this may be accomplished by adding a mixture of the substances in elementary form, or first one element and then the other, to the heated metallic compound, or by adding a sulfide of phosphorus, such as $P_2S_5$, $P_4S_3$, $P_4S_7$, etc., or the like, or by treating with both sulfur and/or phosphorus and a sulfide of phosphorus, or by treating with any other substance or substances containing essentially only the elements sulfur and phosphorus. The phosphorus may be used either in the white (yellow) or red allotropic form, and sulfur may likewise be used in any of its allotropic forms.

However, it is ordinarily more convenient to use a sulfide of phosphorus. In carrying out the reactions described above the proportions of phosphorus sulfide and metal phenate are so chosen that from 0.5 to 2 atoms of phosphorus are reacted with one atom of polyvalent metal, the preferred ratio being within the limits of about 0.8 to 1.2 atoms of phosphorus per atom of phosphorus per atom of metal. Depending upon which sulfide of phosphorus is selected, the atomic ratio of sulfur to metal will then lie within the limits of about 1–5 of sulfur to 1 of metal, preferably from about 2–3 to 1 of metal. These preferred ratios give the products the optimum content of phosphorus and sulfur to impart to them the maximum amount of inhibiting power. In general, these same ratios will be employed also when the reaction is conducted with elemental sulfur and elemental phosphorus.

Although the reaction can be brought about by fusing the metal phenate with phosphorus and sulfur, or with a phosphorus sulfide, it is more convenient to carry out the reaction with the aid of solvents, particularly high boiling hydrocarbon solvents, such as xylol or a petroleum fraction. A particularly preferred reaction medium is a lubricating oil fraction, since the final reaction products can thus be obtained as a mineral oil concentrate of the desired additive, which may be conveniently shipped or stored as such and then readily blended with a lubricating oil base stock in the desired concentration to form a finished lubricating oil blend.

These additives may generally be prepared by dissolving an alkylated phenol or an alkyl phenol sulfide, etc. in a mineral oil or other suitable solvent and treating the same with a metal hydroxide, e. g., Ba(OH)$_2$.8H$_2$O, at 90° to 230° C., preferably at 120° to 190° C. After a further period of heating, free sulfur and free phosphorus, or a sulfide of phosphorus, or other mixture of the elements, is added, heating being continued preferably at 100° to 200° C. to complete the reaction. The period of heating will generally be from about 10 minutes to an hour, although in some cases longer periods may be required. The product is then filtered, giving a concentrate of the desired additive.

If a calcium salt is to be prepared, a less direct action is preferred, since the reaction of alkylated phenols with calcium oxide or hydroxide does not proceed as readily as in the case of barium compounds. Calcium alkyl phenates are preferably prepared by reacting alkyl phenols with calcium methylate or other calcium alcoholate.

Generally, the additives of the present invention are most advantageously blended with lubricating oil base stocks in concentrations between the approximate limits of 0.02% and 5.0% and preferably from 0.1% to 2.0%, although larger amounts may be used for some purposes. The exact amount of addition agent required for maximum improvement depends to a certain extent on the particular products used, the nature of the lubricating oil base stock and the general operating conditions of the engine in which the lubricant is to be employed. This same general range of concentration will also be effective when the additives are to be used in greases and in extreme pressure lubricants, although in the latter instance greater amounts may also be employed.

The lubricating oil base stocks used in the compositions of this invention may be straight mineral lubricating oils or distillates derived from paraffinic, naphthenic, asphaltic or mixed base crudes, or if desired, various blended oils may be employed as well as residuals, particularly those from which asphaltic constituents have been carefully removed. The oils may be refined by conventional methods using acid, alkali and/or clay or other agents such as aluminum chloride, or they may be extracted oils produced, for example, by solvent extraction with solvents of the type of phenol, sulfur dioxide, furfural, dichloro ethyl ether, propane, nitrobenzene, crotonaldehyde, etc. Hydrogenated oils or white oils may be employed as well as synthetic oils prepared, for example, by the polymerization of olefins or by the reaction of oxides of carbon with hydrogen or by the hydrogenation of coal or its products. In certain instances cracking coal tar fractions and coal tar or shale oil distillates may also be used. Also, for special applications, animal, vegetable or fish oils or their hydrogenated or volatilized products may be employed, either alone or in admixture with mineral oils.

For the best results the base stock chosen should normally be that oil which without the new additives present give the optimum performance in the service contemplated. However, since one advantage of the additives is that their use also makes feasible the employment of less satisfactory mineral oils or other oils, no strict rule can be laid down for the choice of the base stock. Certain essentials must of course be observed. The oil must possess the viscosity and volatility characteristics known to be required for the service contemplated. The oil must be a satisfactory solvent for the additive, although in some cases auxiliary solvent agents may be used. The lubricating oils, however they may have been produced, may vary considerably in viscosity and other properties depending upon the particular use for which they are desired, but they usually range from about 40 to 150 seconds Saybolt viscosity at 210° F. For the lubrication of certain low and medium speed Diesel engines the general practice has often been to use a lubricating oil base stock prepared from naphthenic or aromatic crudes and having a Saybolt viscosity at 210° F. of 45 to 90 seconds and a viscosity index of 0 to 50. However, in certain types of Diesel service, particularly with high speed Diesel engines, and in aviation engine and other gasoline engine service, oils of higher viscosity index are often preferred, for example, up to 75 to 100, or even higher, viscosity index.

In addition to the materials to be added according to the present invention, other agents may also be used such as dyes, pour depressors, heat thickened fatty oils, sulfurized fatty oils, organo metallic compounds, metallic or other soaps, sludge dispersers, antioxidants, thickeners, viscosity index improvers, oiliness agents, resins, rubber, olefin polymers, voltolized fats, voltolized mineral oils, and/or voltolized waxes and colloidal solids such as graphite or zinc oxide, etc. Solvents and assisting agents, such as esters, ketones, alcohols, aldehydes, halogenated or nitrated compounds, and the like, may also be employed.

In addition to being employed in crankcase lubricants the additives of the present invention may also be used in extreme pressure lubricants, engine flushing oils, industrial oils, general machinery oils, process oils, rust preventative compositions, and greases. Also their use in motor fuels, Diesel fuels and kerosene is contemplated. A particular application in this regard is their use in motor fuels containing tetraethyl lead or other anti-knock agents, the additives of the present invention serving not only as antioxidants for the fuel but also as stabilizers for the anti-knock agent itself. Since these additives exhibit antioxidant properties and are believed also to possess ability to modify surface activity, they may be employed in asphalts, road oils, waxes, fatty oils of animal or vegetable origin, soaps, and plastics. Similarly, they may be used in natural and synthetic rubber compounding both as vulcanization assistants and as antioxidants, and generally they may be used in any organic materials subject to deterioration by atmospheric oxygen.

The operation and advantages of this invention will be better understood from the following experimental data.

*Example*

A barium alkyl phenol metal salt was prepared using para tertiary octyl phenol and the following quantities of reactants:

| | Grams |
|---|---|
| Alkyl phenol | 1,100 |
| Extracted Panhandle neutral oil | 2,158 |
| "Stenol" (commercial stearyl alcohol) | 240 |
| Barium hydroxide octahydrate (commercial grade) | 845 |

The alkyl phenol, "Stenol" and oil were mixed at 100° C. and, after solution, 12 grams of $Ba(OH)_2 \cdot 8H_2O$ were added at the same temperature. The temperature was increased to 180° C. and the remainder of the $Ba(OH)_2 \cdot 8H_2O$ was added over 2½ hours and the reaction mixture was allowed to soak at 180° C. for an additional hour. The mixture was cooled and divided into two portions and each treated as follows.

One portion (1767 grams) was heated to 170° C. (with stirring and under an inert atmosphere) and 60.6 grams of elemental sulfur was added over a period of 1 hour and the temperature was increased to 190° C. and held for 1 hour prior to cooling to 150° C. and filtering through Hy-Flo, a diatomaceous earth filter aid. When tested in the 15 minute water-sensitivity test (described below) this product gave 46 cc. separation per 500 cc. sample.

The second portion (1867 grams) of barium octyl phenolate-oil suspension was treated at 140° C. with 1.4% (by weight on total reactants) $CO_2$ saturated with $H_2O$ at room temperature over a period of three hours. The $CO_2$ ($+H_2O$) treated product was then split in two portions. One portion was sulfurized with elemental sulfur, using 30.2 gms. sulfur at 170–190° C., and filtered at 150° C. through Hy-Flo. The water sensitivity characteristics of this product were greatly improved over the regularly prepared product, giving 7 and 13 cc. emulsion separation in the 1 and 15 minute tests, compared to 46 cc. for the product of the regular method. The other portion of the $CO_2$ ($+H_2O$) treated product was further treated with $CO_2$ (wet) at 140° C. using 4.5 wt. % more wet $CO_2$ over a period of 6 hours (making a total of 5.9 wt. % $CO_2$ (wet)). The product treated with 5.9 wt. % $CO_2$ (wet) was then sulfurized in the usual way. The final product after filtration when tested in the 1 and 15 minute water-sensitivity tests, gave 3 and 5 cc. emulsion (some of which was clear water) separation per 500 cc. samples, thus demonstrating excellent water-sensitivity characteristics compared to the product conventionally prepared (46 cc. emulsion separation described above) and a second sample of conventionally prepared product which gave 51 cc. separation initially and showed no improvement after treatment of the finished product (after sulfurization) with 3 wt. % $CO_2$ (wet) at 140° C., the latter material giving 50 cc. separation in the 15 minute water-sensitivity test.

The above example demonstrates the great and unexpected advantages of the invention.

The water-sensitivity test referred to hereinabove is made by emulsifying an oil blend containing 2.5 wt. % of the additive concentrate i. e. 1.0% of the additive per se) with 1.0 wt. % of water for 1 and/or 15 minutes using a motor-driven egg-beater type of mixer, e. g. a Mixmaster, operated at maximum speed. After stirring, the emulsified mixtures are poured into 500 cc. graduates and allowed to stand for 24 hours. At the end of this period the amount of emulsion layer separated (expressed as cc./500 cc. sample) from the oil is noted. The smaller the amount of separation, the better are the water resistant qualities of the additive.

It is not intended that this invention be limited to any of the specific examples which have been given solely for the purpose of illustration nor unnecessarily by any theory suggested as to the mechanism of the operation of the invention, but only by the appended claims in which it is intended to claim all novelty inherent in the invention as well as all modifications coming within the scope and spirit of the invention.

It is claimed:

1. The process of improving the water-sensitivity and oil-solubility of a metal salt having the general formula $M[-O-Ar(R)_n]_m$ in which M is a metal, Ar is an aromatic nucleus, R is an alkyl group attached to the nucleus Ar, $n$ representing the number of R groups, and $m$ represents the valency of the metal M, which comprises blowing an oil solution of said salt with $CO_2$ in the presence of $H_2O$, and filtering to remove undesirable precipitate.

2. Process according to claim 1 in which M is a divalent metal and $m$ is 2.

3. The process of reducing the water-sensitivity and improving the oil-solubility of a metal salt consisting essentially of the neutralization product of barium hydroxide and octyl phenol which comprises blowing a mineral lubricating oil solution of said salt with about 5 to 10% of carbon dioxide containing a small amount of moisture, and filtering to remove precipitated barium carbonate.

4. The process which comprises first reducing the water-sensitivity and increasing the oil-solubility of a metal salt consisting essentially of the neutralization product of an oxygen-containing basic metal neutralizing agent and a compound containing at least one grouping $$-Y-Ar(X)_n$$

where Y is an element in the righthand side of group VI of the Mendeleeff Periodic Table, Ar is an aromatic nucleus containing $n$ number of X substituents, by treating said salt while dispersed in mineral oil with carbon dioxide in the presence of moisture and subsequently treating the water-insensitized metal salt with elemental sulfur and filtering.

5. Process according to claim 4 in which the metal is a divalent metal.

6. The process which comprises dissolving tertiary octyl phenol in a mineral lubricating oil and neutralizing with barium hydroxide to make a barium octyl phenolate dispersed in oil, blowing the resultant dispersion of metal salt in oil with carbon dioxide containing moisture, to precipitate some barium carbonate and to produce a barium octyl phenolate of reduced water-sensitivity and superior oil-solubility, and finally reacting said treated barium octyl phenolate with elemental sulfur, and filtering to remove undesirable precipitate.

7. Process according to claim 10 in which a small amount of stearyl alcohol is dissolved in the oil with the octyl phenol, the amount of carbon dioxide used is about 5 to 10%, and about 1 to 5 atomic weight proportions of sulfur are used per one atomic weight proportion of barium metal.

8. The process which comprises first reducing the water-sensitivity and increasing the oil-solubility of a metal salt consisting essentially of the neutralization product of an oxygen-containing basic metal neutralizing agent and a compound containing at least one grouping —Y—Ar(X)$_n$ where Y is an element in the righthand side of group VI of the Mendeleeff Periodic Table, Ar is an aromatic nucleus containing $n$ number of X substituents, by treating said salt while dispersed in mineral oil with carbon dioxide in the presence of moisture and subsequently treating with a phosphorus sulfide and filtering.

9. The process of improving the water-sensitivity and oil-solubility of a metal salt having the general formula $$M[\text{—O—Ar}(R)_n]_m$$

in which M is a polyvalent metal, Ar is an aromatic nucleus, R is an alkyl group attached to the nucleus Ar, $n$ representing the number of R groups, and $m$ represents the valence of the metal $n$, which comprises blowing an oil solution of said salt with a weakly acid gas in the presence of moisture, and filtering to remove undesirable precipitate.

10. Process according to claim 9 in which the weakly acid gas is carbon dioxide.

11. The process of reducing the water-sensitivity and improving the oil-solubility of a polyvalent metal alkyl phenolate which comprises treating the same with a weakly acid gas in the presence of moisture, and filtering to remove undesirable precipitate.

12. The process of reducing the water-sensitivity and improving the oil-solubility of a polyvalent metal alkyl phenolate which comprises blowing a mineral lubricating oil solution of the same with about 1 to 10% by weight of a weakly acid gas in the presence of about 0.2 to 10% of water, both quantities being based on the amount of the phenolate present, and filtering to remove undesirable precipitate.

PRESCOTT L. RICHARDS.